United States Patent [19]
Yamamoto

[11] Patent Number: 5,811,958
[45] Date of Patent: Sep. 22, 1998

[54] PORTABLE ELECTRIC POWER SOURCE WITH ATTACHED BATTERY CHARGER

[76] Inventor: Shigeo Yamamoto, 7-20 Kita-Gochome Higashi-kaigan, Chigasaki, Kanagawa-prefecture, Japan

[21] Appl. No.: 749,692

[22] Filed: Nov. 15, 1996

[30] Foreign Application Priority Data

Nov. 17, 1995 [JP] Japan .................................. 7-300318
Jan. 31, 1996 [JP] Japan .................................... 8-15347

[51] Int. Cl.$^6$ ................................................. H01M 10/46
[52] U.S. Cl. ......................... 320/101; 320/103; 320/125; 136/DIG. 2
[58] Field of Search .................................. 320/1, 5, 6, 15, 320/21, 19, 27, 57, 61; 136/DIG. 2; 323/906

[56] References Cited

U.S. PATENT DOCUMENTS

| 2,889,490 | 6/1959 | Paradise . | |
|---|---|---|---|
| 4,134,057 | 1/1979 | Portmann | 320/61 |
| 4,701,693 | 10/1987 | Nishimura | 323/906 X |
| 4,963,811 | 10/1990 | Weber | 320/1 |

Primary Examiner—Edward Tso
Attorney, Agent, or Firm—Hopgood, Calimafde, Kalil & Judlowe LLP

[57] ABSTRACT

A portable electric power source characterized by the fact an electric double layer battery is placed at a stage which follows a cell which generates electricity by receiving sunlight; and in which in order to produce current bit by bit from said electric double layer battery, the current capacity of said electric double layer battery is made smaller than the current capacity of a constant voltage secondary battery of a following stage; and which is further characterized by the fact that a DC—DC convertor is connected to the next stage, so that charging can be carried out at said constant voltage secondary battery even at an electric potential in which the output voltage of said electric double layer battery is lower than the voltage of the constant voltage secondary battery attached to the following stage. The portable electric power source device with attached battery charger of the present invention effectively allows more than 90% of consumer semiconductor devices or appliances typically used in the home to be powered by distribution management. This invention also makes possible long term charging of the electrical power source of vehicles, supplying current and instantaneous pulse voltage, as is needed for automobile ignition.

7 Claims, 10 Drawing Sheets

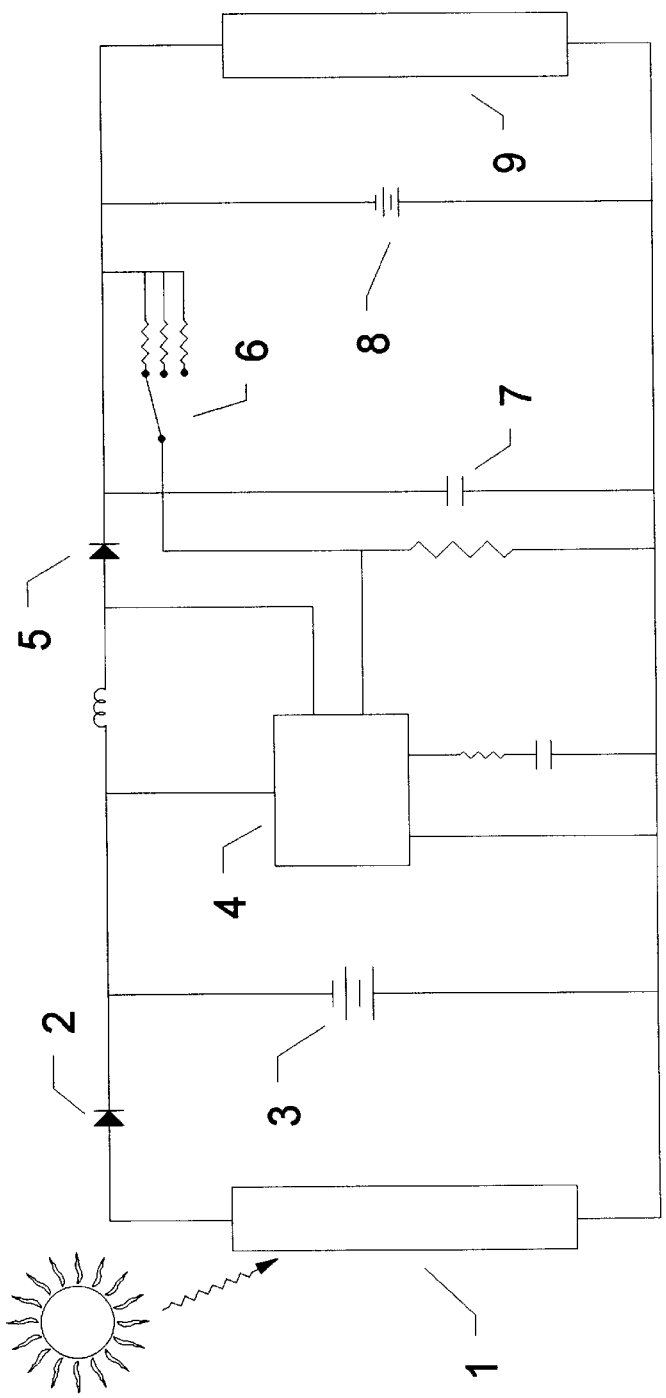
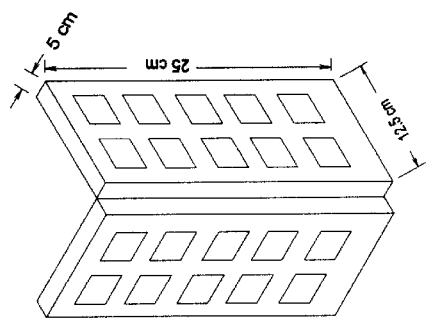
Fig. 1(a)
Fig. 1(b)

ON/OFF Control

FIG.5
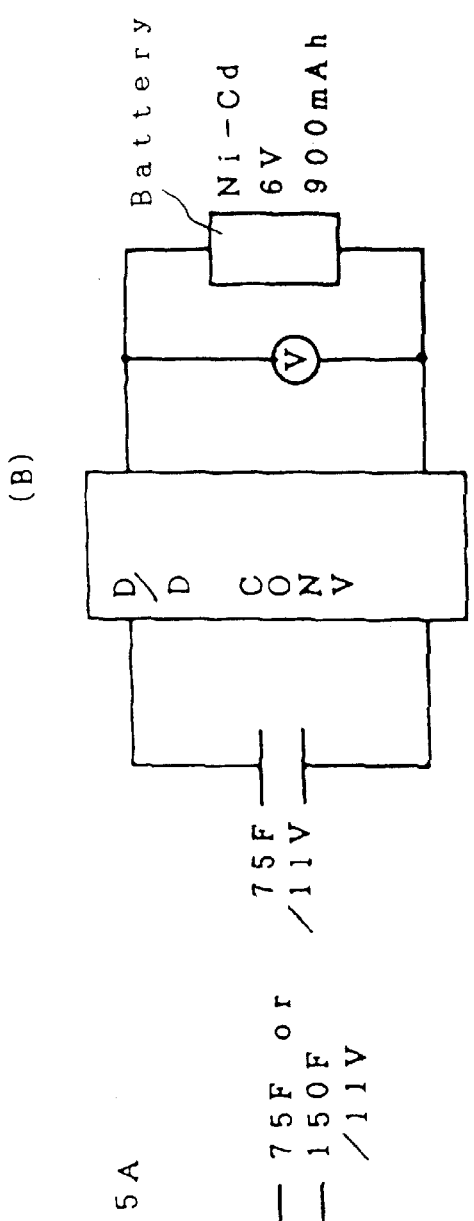
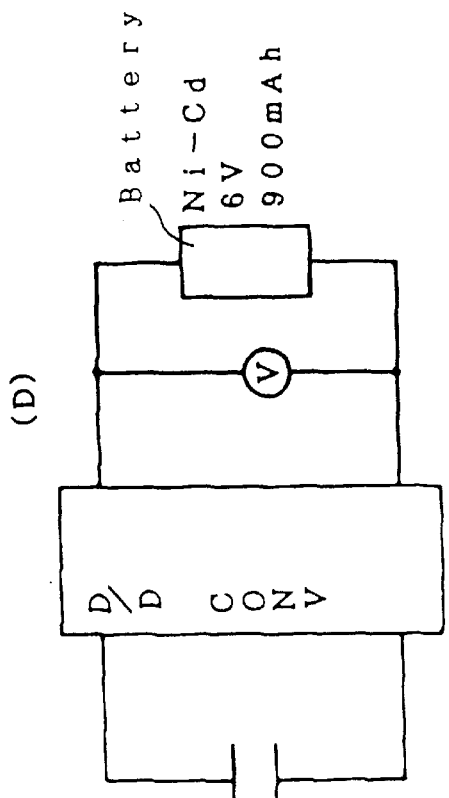
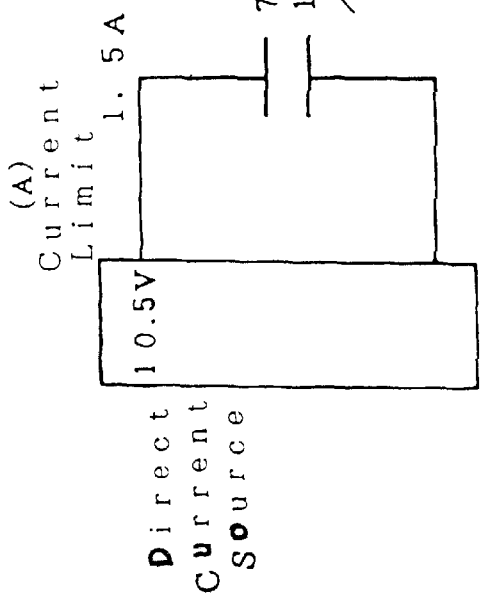
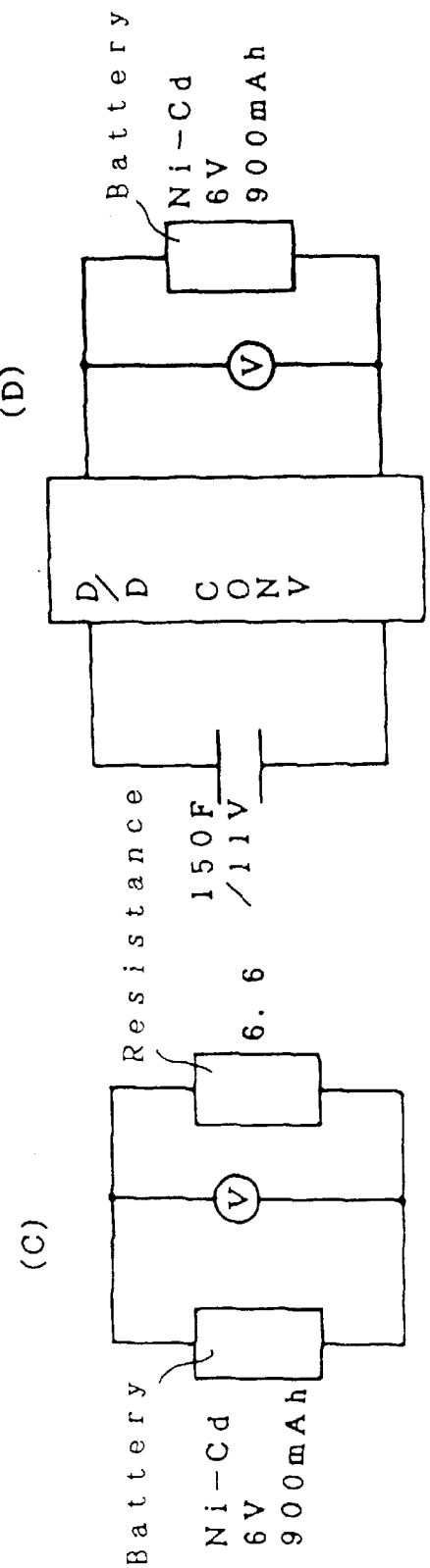

PORTABLE ELECTRIC POWER SOURCE WITH ATTACHED BATTERY CHARGER

BACKGROUND OF THE INVENTION

1. Field of the Invention

The present invention pertains to the fabrication of an electric power source, and in particular to a portable electric power system with attached battery charger, which converts sunlight into electricity and stores the converted electricity. The battery electric power system is one in which a secondary battery with constant voltage charging is placed at the stage following a cell which receives light and generates electric power. Electric power from said cell is stored in said constant current type secondary battery, and is taken from this constant current type secondary battery to charge the constant voltage type secondary battery of the following stage. The charging time from the constant current type secondary battery to the constant voltage type secondary battery of the following stage requires a long time, and by supplying a charging current at the constant voltage type secondary battery of the following stage, it is possible to have an electric power system with long hours of operation for load circuits connected to the constant voltage battery—an essentially 24 hour load operating capability—even at an electric potential in which the output voltage of the constant current type secondary battery is sufficiently lower than the voltage of the constant voltage type secondary battery of the following stage, by extending the charging time in time zones without sunlight, or which are overcast or rainy.

2. The State of the Art

The sun radiates to the earth an average of 1 kW of energy per square meter in the region between 65° north and 65° south of the equator. In a semiconductor monocrystalline material, about 15–16% of this energy is converted to electricity. In a polycrystalline material about 14% is converted, and in an amorphous material (non-crystalline) about 7–8% is converted (conversion efficiency). A one square meter monocrystalline or polycrystalline cell produces a quantity of electricity which lights only a single (incandescent) light bulb, if the sun is shining. The electricity generated using an amorphous material of the same size cannot light the light bulb. Because many monocrystalline materials are made by refining and re-refining polycrystalline materials, and then subjected to a recovery process, or other similar processing operation, their cost is higher than that of polycrystalline materials. Although the conversion efficiency of monocrystalline cells shows an increase of 1–2%, as stated above, they normally cost more than twice what polycrystalline cells cost.

Amorphous materials, on the other hand, do not achieve half the efficiency of polycrystalline materials. Yet there is hardly any cost difference in the manufacturing process for non-crystalline materials and polycrystalline materials. There is, however, a disadvantage: the so-called "long-term changes", by which the properties of the photoelectric cell deteriorate with the passage of time. When this degradation happens, twice the surface area of a polycrystalline cell is needed in order to achieve the same performance. In order to produce the 130–140 W of electrical energy produced per square meter by a polycrystalline material with a conversion efficiency of about 14%, twice the planar surface of the cell is needed with an amorphous material. This space requirement is not terribly desirable from the standpoint of cost or space.

At present, a 100–200 V AC electrical power source is provided for light and heavy industry. This power source is generated originally from such natural resources as hydro-electric power, coal, petroleum, liquid propane gas, or atomic power. These energy sources are extremely large, requiring large resources for their exploitation, and are impractical for generating the small amount of energy that must be provided on a house-by-house basis. Similarly, these energy sources are too dangerous or cumbersome to use and/or store to be supplied on a house-to-house basis. For this reason, electricity generating plants are typically situated away from inhabited areas, whether in the mountains, valleys, or oceans. In order to provide this electrical energy over long distances it is raised to 100 V or 200 V, and sent over transmission lines to supply it to each home or factory. If not done in this fashion, safety cannot be maintained, legal control is impossible, and the cost is expensive. We call this a central management method, and this central method is entrusted to the power companies and the government.

A solar cell having a usable area of one square meter, for example, generates no more energy when the sun is shining than is needed for ten 100 W light bulbs. When provided by the electrical distribution system as needed, it is called "sale of electricity". The cells are placed on the roof or exterior wall of a home, and a system is used in which a portion of the electric power generating source is purchased from the power company during the day. Although this method is extremely significant in and of itself, it is too costly when viewed from the standpoint of technology, and it meets only 2% or less of energy needs. Further, countries with advanced electrical distribution, such as Japan, are rare in the world, and this sort of electrical transmission is impossible in many of the countries of Southeast Asia, the Near East, the Middle East, China, and Central and South America. In the same fashion, conditions are difficult on the sea and in the mountains, where there is no electrical distribution system.

Currently, the semiconductor circuits used in the electrical home appliances typically have innumerable memory elements driven by 3.3 V, and other circuit elements typically driven by 5.5 V. In order to operate these circuits, a commercial power source of 100 V is generally used. This is accomplished by dropping the voltage and amps of the 100 V alternating current, and rectifying it to a direct power source for signals. When a 100 V commercial power source is dropped to the low voltage and current used in an IC circuit of below 12 Volts, there are legal regulations according to the Law of Electrical Use (Japan), by which various restrictions are placed on its use, and it cannot be tampered with at will. Also, if the transistor circuit has a PNP—NPN complimentary structure, an unbalanced current may be produced on the switching transistor side, causing a short if both transistors do not have similar characteristics, and a fire may be caused as an unintended consequence. In a power source using a PNP or NPN single grounded transistor element, there must be a large consumption of the power source in order for a large current to flow. At times, the amount of current is too large, and the circuit may short. Excess current may flow at the load, causing this circuit to short occasionally.

The most suitable power source for a transistor using a voltage of 20 V or below, or a current of 2 A or below, is a solar cell which produces electricity and stores it in a solar battery. More specifically, devices which use semiconductors (in most cases devices driven by 6 V electrode or below), or which are driven at a voltage of 12 V, as in an automobile, by adding a secondary battery along with the cell (e.g., the lead battery mounted in an automobile may also serve as this secondary battery; or a hybrid mechanism, energy from gasoline may be used with it—electrical distribution lines are not used) are called distribution management mechanisms because they can be managed as a single unit. In these, the energy which operates the device is several hundredths or several thousandths of the energy of the centralized management system power source, and it is possible to provide most of this by the distribution management mechanism power source. In sum, in a distribution system, unlike a centralized management system, a solar battery technology is superb as a power source. Also, because the batteries do not have to be replaced for decades, they are useful as a power source which prevents environmental damage. Solar batteries, in this sense, involve a technology which, at about 1% of the total amount of energy, can provide for about 90% or more of semiconductor products.

In existing technology, electricity from solar cells (e.g., Si, GaAs) can be stored in automobile lead storage batteries, and can be used to operate transistor devices. In this existing technology: (1) the charging and discharging of the secondary battery is 400 times or less; and (2) an insulating layer of lead sulfate ($PbSO_4$) is formed on the electrode of the lead storage battery. As a result, charging must be carried out accordingly. The lead sulfate cannot be dissolved without a strong charging. Consequently, charging can be done only about 200 times or less. Also lead storage batteries for 12 V use are heavy, weighing on average about 8–10 kg. Although Ni—Cd and lithium batteries have a long charging and discharging life cycle, their cost is high.

SUMMARY AND OBJECTS OF THE INVENTION

The present invention attempts to remedy the above-mentioned disadvantages. One such remedy provided by this invention is a greatly improved longevity of a secondary battery.

Also, the invention offers a portable electric power source with attached battery charger which can be used continuously—almost perpetually—for five years or longer than existing batteries.

The portable electric power source with attached battery charger of the present invention is characterized by the fact that it places, for example, a fast charging secondary battery, for example, an electric double layer battery which has active carbon as the electrode, at the stage after a cell which receives light from the sun and generates electricity; and by the fact that it can operate at a voltage which is lower than the voltage of the secondary battery of the following stage; and by the fact that a DC—DC convertor preferably is placed at the following stage to supply power once this voltage has been elevated (stepped up); and further, by the fact that a secondary battery, for example, a Ni—Cd or lithium battery or the like, is provided which can be charged by the output of the convertor, and which moreover, provides electric power to the load of the last stage.

According to the Meteorological Bureau of Japan, the average daily illumination time over one year is 3.8 hours. Moreover, in an ordinary 12 V battery, for example, a lead storage secondary battery, Ni—Cd secondary battery, or lithium secondary battery, the charging time from 1 V is at best 4–6 hours. This means that charging cannot be completed on an average day. The present invention, by using the above-mentioned means, completes the storage of electric power generated by the cell in the secondary battery of the first stage in at least one hour. In order to use the stored quantity of electricity of this secondary battery ($F=1 \times T/V$) effectively, the primary side is operated at the smallest voltage possible, for example, within 3 V. By raising the voltage of the secondary battery side to slightly higher than the voltage of the secondary battery of the following stage, and supplying this power to the secondary battery of the next stage, and by extending the number of charge/discharge cycles of the secondary battery of the next stage, it is possible to the use the secondary battery of the next stage continuously—almost perpetually—for five years over its life span. (The charge/discharge cycle is usually called the respiration of the battery; although the respiration of a secondary battery is considered to have a limit of 400 times, by lengthening the respiration time of the battery, a respiration number of 1000 times or more is possible.) Also, by using the electric double layer battery as the fast-charging secondary battery of the first stage, the charge/discharge cycle can be made almost limitless. The capacity of an electric double layer battery is on the order of one-tenth that of a lead storage battery, and moreover, the rate of discharge is about one-sixth. The charging from the cell to the electric double layer battery is carried out for preferred embodiment in about 3.8 hours, and the constant voltage battery at the following stage can be charged by the overflow current. This drives the load circuit, and at night or on overcast days, the charging current is supplemented to the battery of the following stage slowly, bit-by-bit. Although the voltage of the electric double layer battery becomes lower than the electric potential of the constant voltage battery of the following stage, by attaching a DC—DC convertor to the electric secondary battery, a long charging time is enabled by using the energy stored in the electric double layer battery efficiently.

By changing to a digital format either partially or entirely, and enabling a circuit that ordinarily requires about 200 mA to use one-tenth the current, the load can be operated for 4–6 hours, at an average 20 mA.

BRIEF DESCRIPTION OF THE DRAWINGS

FIG. 1(a) is a circuit diagram of the portable electric power source device with attached battery charger, of the present invention. FIG. 1(b) is a drawing of the structure of the device in outline form.

FIGS. 5(A–D) is a chart of the capacitor characteristics for delaying the charging speed of the electric double layer battery.

Figure 1C:
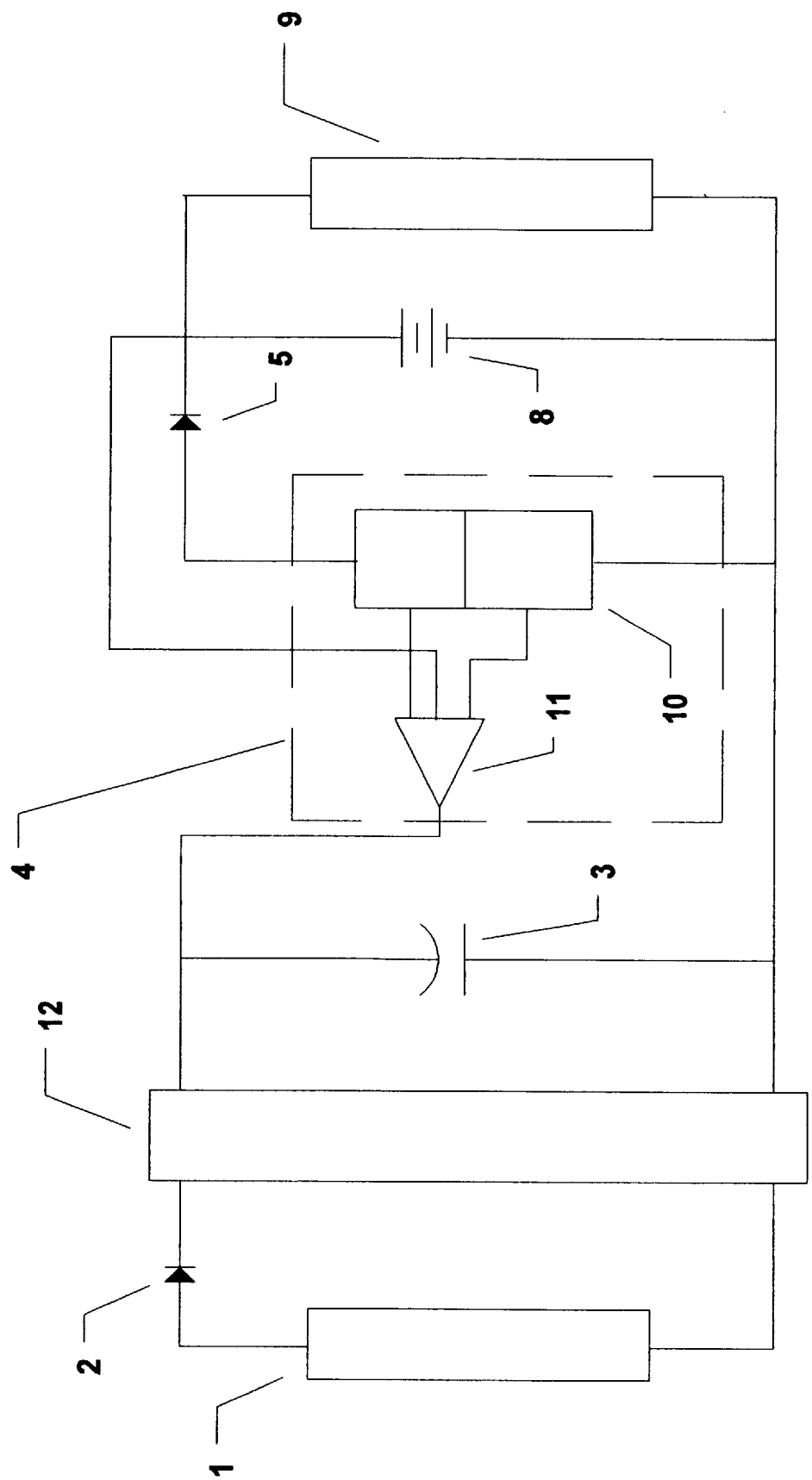
FIG. 1(c) is another embodiment of the portable electric power source device shown in FIG. 1(a).

Key to Drawings:
1. Cell
2. Diode for preventing reverse current flow and for controlling voltage
3. Secondary battery for high-speed charging
4. DC—DC convertor
5. Diode for preventing reverse flow and for controlling voltage 6. Switch current
7. Capacitor for removing alternating current
8. Secondary battery
9. Load
10. Stepper Circuit
11. Comparator
12. DC—DC converter
13. IC chip provided with step-inverter and control circuit such as a timing circuit, oscillator circuit, or the like.

DETAILED DESCRIPTION OF SPECIFIC EMBODIMENTS

The technical terms used in this specification have the following definitions. A "secondary battery" is one which can be charged and discharged repeatedly. Conversely, a "primary battery", as is true for a dry cell, has a life span in which the stored electric energy is discharged only once, and expended.

A "constant current type secondary battery" is a secondary battery in which the current value is comparatively constant, although there are rises and drops in the voltage, as in the capacitor type battery to be described later.

Although a "constant voltage type secondary battery" is a battery in which the voltage is constant, the current changes. Secondary batteries are usually of this type. Lead storage batteries, Ni—Cd secondary batteries, and lithium secondary batteries belong to this type.

Figure 2:
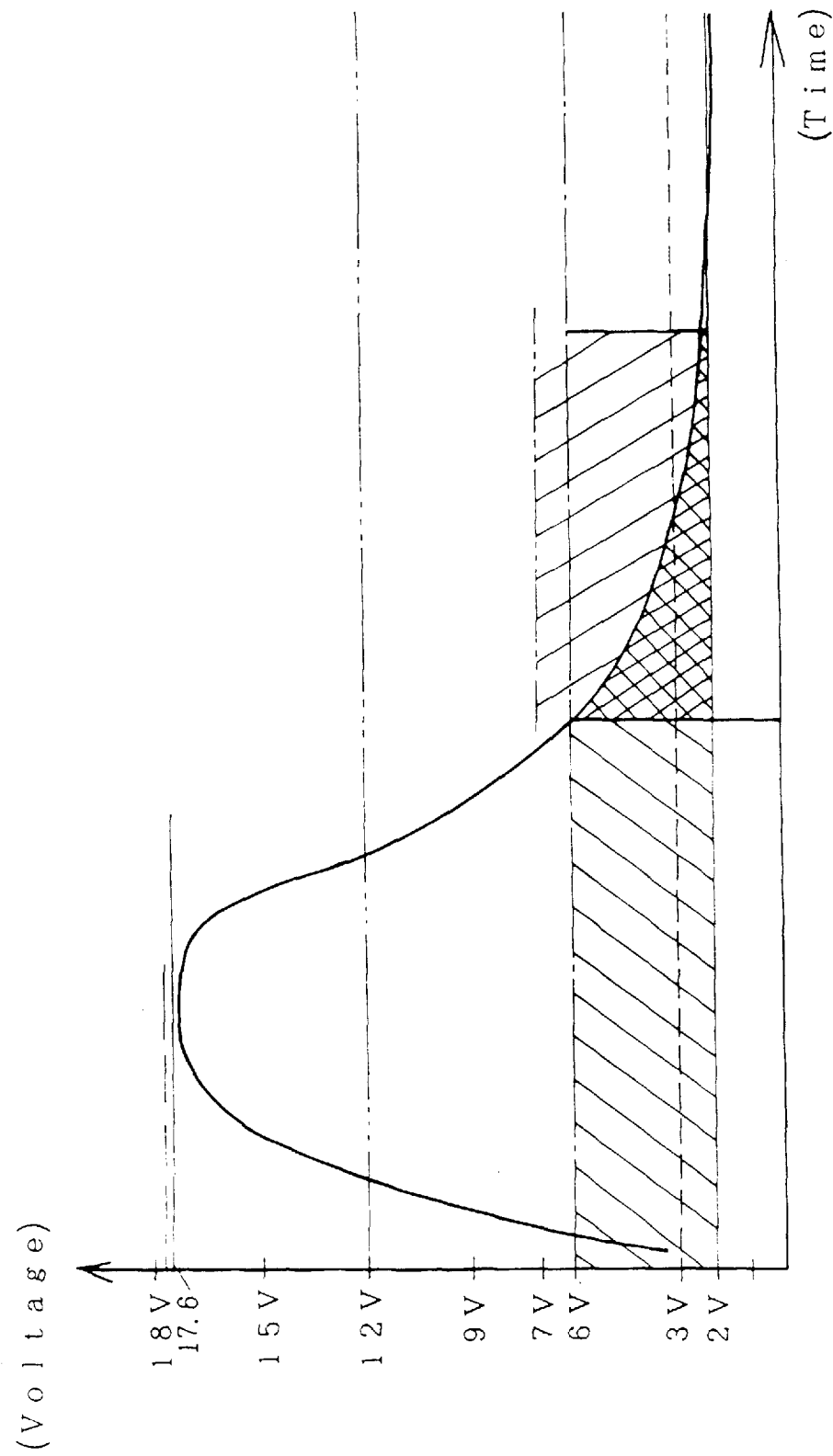
FIG. 2 is a diagram of the voltage characteristics of the electric double layer battery.

An "electric double layer battery" is a classic constant current type secondary battery with the bell-shaped voltage characteristics of FIG. 2. The constant voltage characteristics of this type are almost flat. Why this is used to charge a constant voltage battery rapidly will be explained later.

Moreover, although the Japanese call a cell which converts sunlight to electricity a "solar battery", this is wrong. A cell can only convert sunlight into electricity, and lacks a storage function. In order to store the energy produced, a storage battery is needed. Solar batteries thus involve a technology which requires first of all, reducing the vagueness of the term itself.

The present invention will be explained more fully below based on the concrete examples in the drawings.

In FIG. 1(a), solar cell 1 converts sunlight into electricity; preferably the physical dimensions shown in FIG. 1(b). The cell preferably has outputs of 16 V and 5.3 W. Diode 2 prevents reverse current flow and can also control the voltage. Secondary battery 3 is connected in parallel with the solar cell and is for rapid charging (an electric double layer battery is preferably used). The secondary battery stores the electricity delivered from the solar cell; a 75 F, 15 V battery is preferably used.

Figure 3:
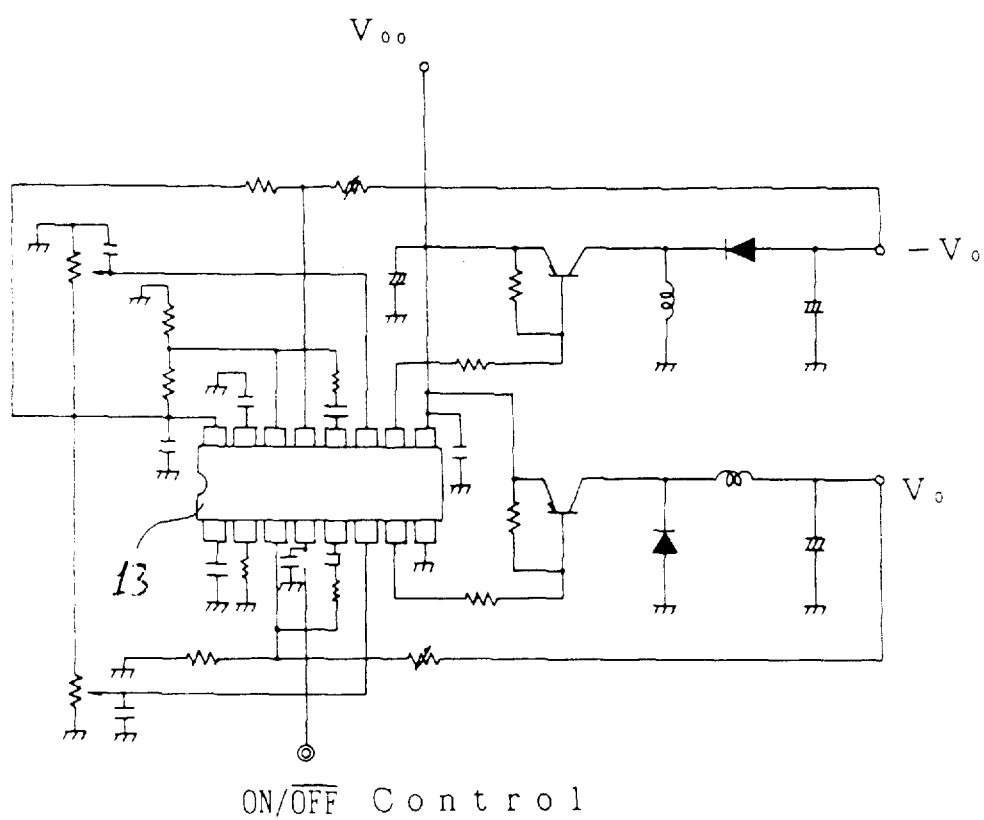
FIG. 3 is a diagram of the stepping circuit in the DC—DC converter.
Figure 7:
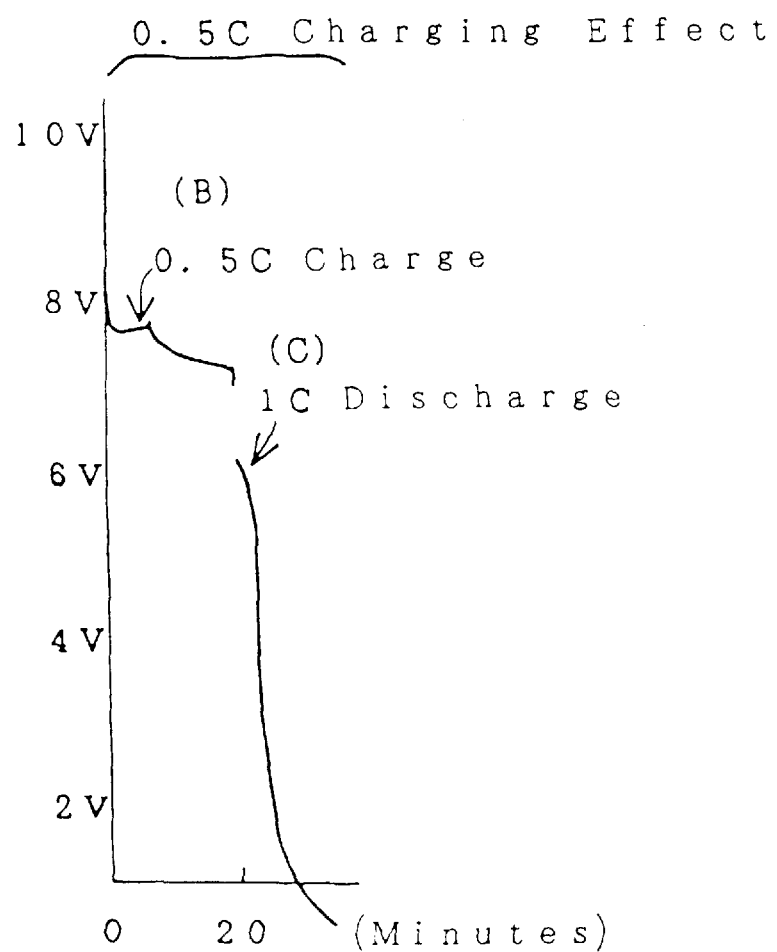

Converter 4 is a DC—DC converter. A DC-AC-DC type converter can also be used; this type of converter operates even when the voltage of the secondary battery for charging is lower than the voltage of last stage secondary battery 8 of the following stage. This happens because the secondary battery for charging is a constant voltage, a so-called "capacitor type", and the voltage changes in a bell-shaped curve as shown in FIG. 2. In order to completely consume almost all of the energy contained in the battery, the electrical energy preferably is used within a range of 3 V–17 V. The DC—DC converter supplies power to the last stage secondary battery 8 (preferably Ni—Cd or lithium battery) over the diode 5 (which prevents reverse current) and provides voltage control. Capacitor 7 eliminates alternating current. To what extent this is delayed is determined by the capacity of the electric double layer battery, as shown in FIGS. 3 and 7, and in particular, by having the current capacity smaller than the constant voltage battery of the following stage; preferably the current capacity of the electrical double layer battery is about 5–40%, more preferably about one-tenth of the current of the following stage.

The load on the system is represented at 9. For example, when a DoCoMoN-type telephone is used as a home appliance to be powered by the inventive system of this invention, the last stage Ni—Cd battery is preferably a 6 V 900 mAh battery. The wait time band becomes a received signal, and although the load current is 100 mA, it is made to drop to 10 or 20 mA. It should be noted that the capacity of the electric double layer battery is about one-tenth of that of an ordinary battery; in turn, the internal resistance is about ten times higher.

The reason why the charging speed of the constant voltage type battery is delayed, and a charging current is supplied to the constant voltage type secondary battery of the following stage even at a voltage sufficiently lower than its voltage, is to extend the operation time of the load circuit, so that charging will be possible in time zones where there is no sunlight, or on overcast or rainy days. Optional switch 6 in FIG. 1(a) is for adjusting the voltage given to the secondary battery of the last stage. For example, depending on the desired characteristics of the system, the switch can be set at 7 V, 8 V, or 9 V.

An alternate embodiment is shown in FIG. 1(c), in which the above-defined reference numerals are applicable. The DC—DC converter 4 is preferably a chopper-type stepping inverter circuit including step circuit 10 and comparator 11. The DC—DC converter circuit, comparator, and step circuit of FIG. 1(c), and FIG. 3, along with being block diagrams of a working example of charging by a discharge current from electric double-layer battery 3 to the Ni—Cd constant voltage battery 8 by a discharge current, are drawings of a chopper-type stepping inverter circuit. The comparator and stepping circuit are an especially preferred embodiment of the invention, a step circuit connected to the comparator circuit of DC—DC converter 4. An additional DC—DC converter 12 can be used to protect the electrical double-layer battery.

Even if this were not the case, the electric double layer battery would still be useful. First, batteries must be charged at a constant current. Conversely, a constant voltage type method is useful during discharging. The voltage characteristics of an electric double layer battery are of the type known for capacitors—namely, they slope downwards to the right, as shown in FIG. 2. Thus, the output of the solar cell after the diode, preferably at about 15 V, can be stored in electric double layer battery 3 in a short time. It may be mentioned in passing that if the electrical capacity of Electric Double Layer Battery 3 is 150 F, $$150 F = \frac{X(A) \times 3600 \text{ seconds}}{(12-2)V} \quad \therefore X \approx 420 \text{ mAh}$$

Using this embodiment, saturation is reached within about 30 minutes (calculated value of 24 minutes); and afterwards, a 420 mAh current is supplied to the output side. It may be said in this context that, even if charging is done at 5 A with a 12 V lead storage automobile battery, about 2.8 hours is needed, and at least about eight hours with charging at 2 A; about 5 hours is needed to remove the lead sulfate:

$$4200F = \frac{5(A) \times 3600 \text{ hours}}{12V} \quad \therefore X \approx 2.8 \text{ hours}$$

A charging requiring two days is a matter about which everyday car owners would have to be persuaded. In this fashion, the electric double layer battery 3, with its presently available capacity, would have a difficult time fulfilling its functions when used alone. Of course, although it could be used as a battery for a clock of about 0.001 A (1 mA) or for some liquid crystal products; but a transistor device requiring about 1 A would be a problem. The reason for this is, as in the aforementioned calculation, $$150F = \frac{1 \times T \text{seconds}}{(12-2)V} \quad \therefore T = 1500 \text{ sec.} = 25 \text{ min.}$$

and the battery action disappears in about 15 minutes. Naturally, if the sun is out, this can be provided at 1 A or higher, and this is essentially a problem for after sunset.

Thus, whatever the case, we must rely on the pure secondary battery. A secondary battery, for example, a Ni—Cd secondary battery becomes necessary as the main battery. However, about 400 times is the limit for charging and discharging this type of secondary battery. Although a battery with a capacity to be charged and discharged about 1000 times is said to be possible, it does not yet exist. With about 400 cycles of charging and discharging, the battery goes bad after about one year, or two years at best. Thus, for charging which can be carried out 400 times, although the charging power is small, it can be carried out in the usual time, and accordingly, the effective time of the secondary battery is essentially lengthened. For this reason, an electric double layer battery is used for the rapid-charging secondary battery 3, and within thirty minutes this results in a "full tank", a full charge for the battery. The important matter is then reduced to how to carry out the charging from the rapid-charging secondary battery over a long period of time.

As shown in FIG. 2, the capacity characteristics of the electric double-layer battery are different from a constant voltage type secondary battery, displaying bell curve-shaped voltage characteristics which show the condition of the constant current type secondary battery. This is a necessary requirement for battery charging. Thus, using almost all batteries with these voltage characteristics, it is possible to operate a load for a sufficiently longer time than a single, ordinary battery, by stepping up the voltage at the base of the curve—namely, the low voltage region of 2–3 V—in order to flatten the voltage like a constant voltage type secondary battery. Consequently, a reference voltage must be set, preferably in one of four ways.

(1) The voltage from the solar cell is regulated by a DC—DC converter and is used as the input to the electric double-layer battery. For example, given an output of 17.6 V and 1.4 A for the solar cell, if the electric double-layer battery is 150 F and 11 V, the output of the DC—DC convertor must be brought close to 12 V, and consequently the reference voltage must be 11 V–12 V.

(2) When the voltage of the electric double-layer battery is regulated by the DC—DC convertor, and made to be near the voltage of the following stage, and is taken as the reference voltage, the output of the electric double-layer battery is near 12 V. This is regulated by the DC—DC convertor, and the reference voltage is taken as the voltage close to the input of an ordinary secondary battery (7.2 V in this example).

(3) When the output of the step invertor is taken as the reference voltage, a charging output is used which has been increased from 10%–20% of its output. In this example it is close to 7 V.

(4) When the voltage of the constant voltage secondary battery is taken as the reference voltage, it is close to 6 V, when a 6 V, 0.9 Ah battery is used as the constant voltage type secondary battery. This method is especially preferred. Because the output of the electric double-layer battery changes as mentioned previously (for example from 12 V to 0 V), a comparison circuit (e.g., 11 in FIG. 1(c)) must be provided to distinguish when the output voltage of the electric double-layer battery is higher than or lower than the reference voltage. When the output of comparison circuit is higher than the reference voltage, this is made to be the charging voltage of an ordinary secondary battery (7.2V) by means of a voltage step down circuit, after it has been converted to alternating current by a chopper circuit. This charges the aforementioned ordinary secondary battery through a voltage control diode. On the other hand, when the output of the comparison circuit is lower than the reference voltage, this is made to be the charging voltage of an ordinary secondary battery (7.2 V) by means of a voltage step up circuit, after it has been converted to alternating current by the chopper circuit. Also, when the reference voltage is made to be 7.2 V (for example), it is clear that only a step down circuit should be connected to the stage after the comparison circuit.

Figure 4:
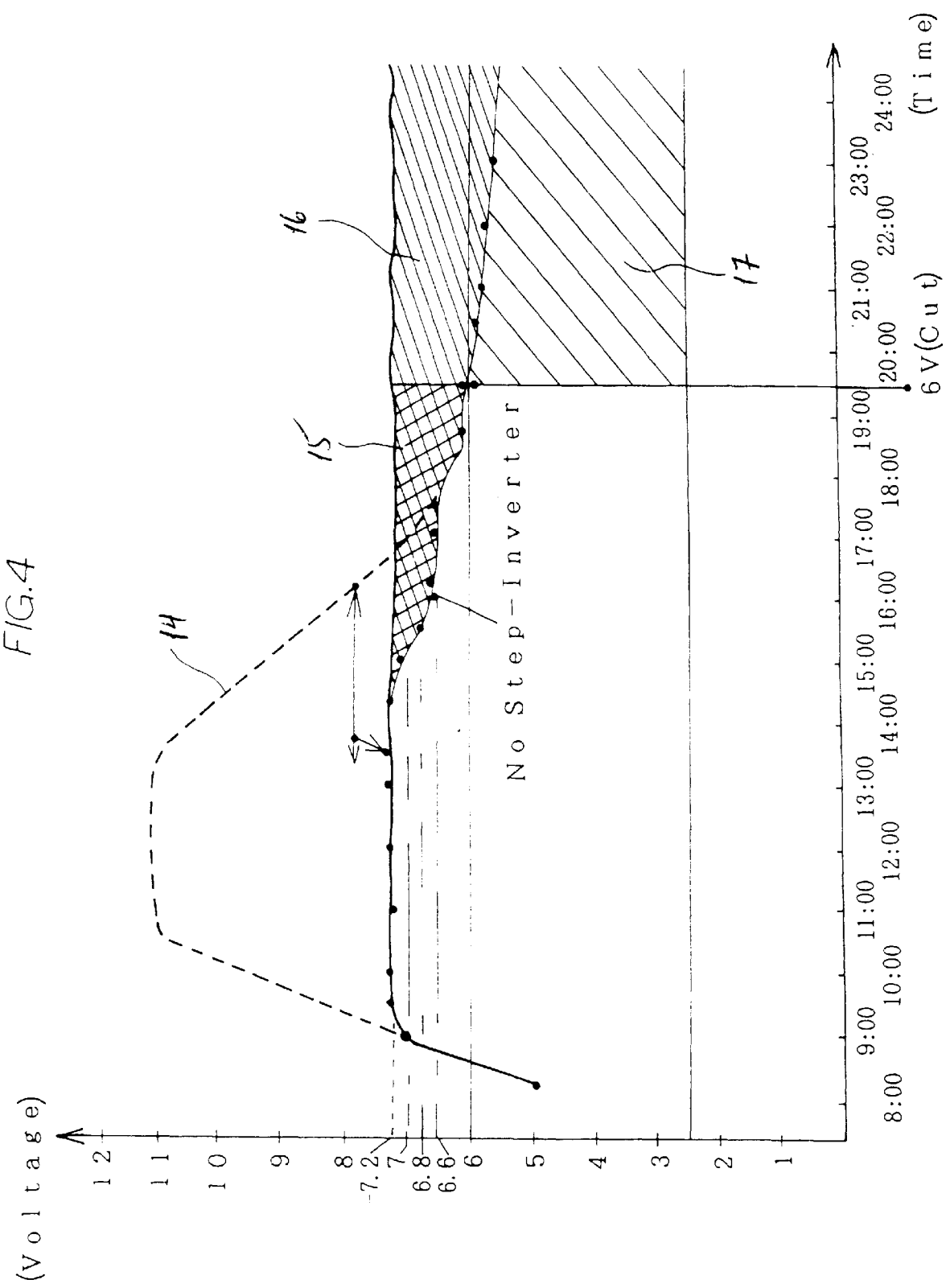
FIG. 4 shows the observed values of the output side of an electric double-layer battery in a standard six volt power source of the portable power device with attached battery charger of the present invention.

FIG. 3 shows an example of a circuit in which the reference voltage is made to be that of an ordinary secondary battery. In FIG. 3, 13 is an IC (integrated circuit chip) provided with a comparison circuit, a step inverter circuit 4 (a step-up, a step-down, or both), and a control circuit such as a timing circuit, or an oscillator circuit. Also, FIG. 4 shows, at these experimental values, a Dotted Line 14 which is the output voltage of the electric double-layer battery. The Hatching 15 is the recovery voltage caused by the chopper-type step-down inverter, and Hatching 16 is the recovery voltage obtained when the voltage region shown by Hatching 17 is stepped-up.

FIG. 5 shows the changes in the charge to the Ni—Cd constant voltage battery caused by the discharge current from the electric double layer battery. Block Diagram (A) shows the charging circuit (charging up to 10.5 V) from the cell (10.5 V) to the electric double layer battery (75 F/11 V and 150 F/11 V). Block Diagram (B) in FIG. 5 is the charging circuit from the electric double layer battery to the Ni—Cd battery after the electric double layer battery has been charged to 10.5 V according to Block Diagram (A). Block Diagram (C) shows the discharge circuit from the Ni—Cd battery to the load. Block Diagram (D) is the same type of block diagram as (B), but uses a 150 F/11 V battery as the electric double layer battery.

Figure 6:
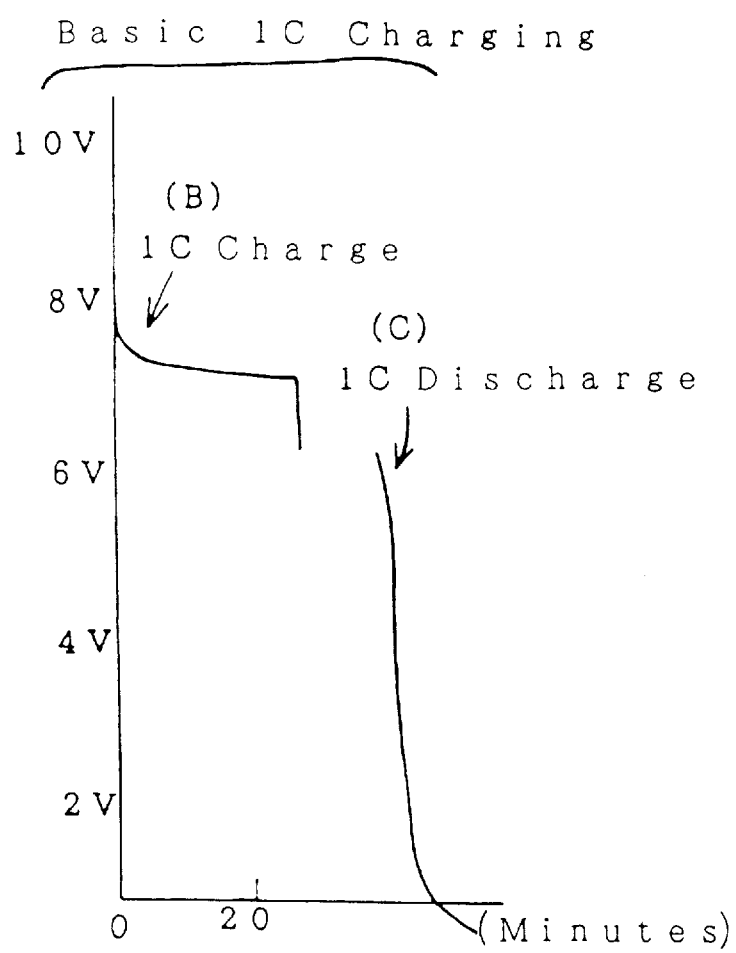
FIGS. 6–9 are charts of the capacitor characteristics for delaying the charging speed of the electric double layer battery at various charging currents (based on 900 mAh equals 1 C).
Figure 8:
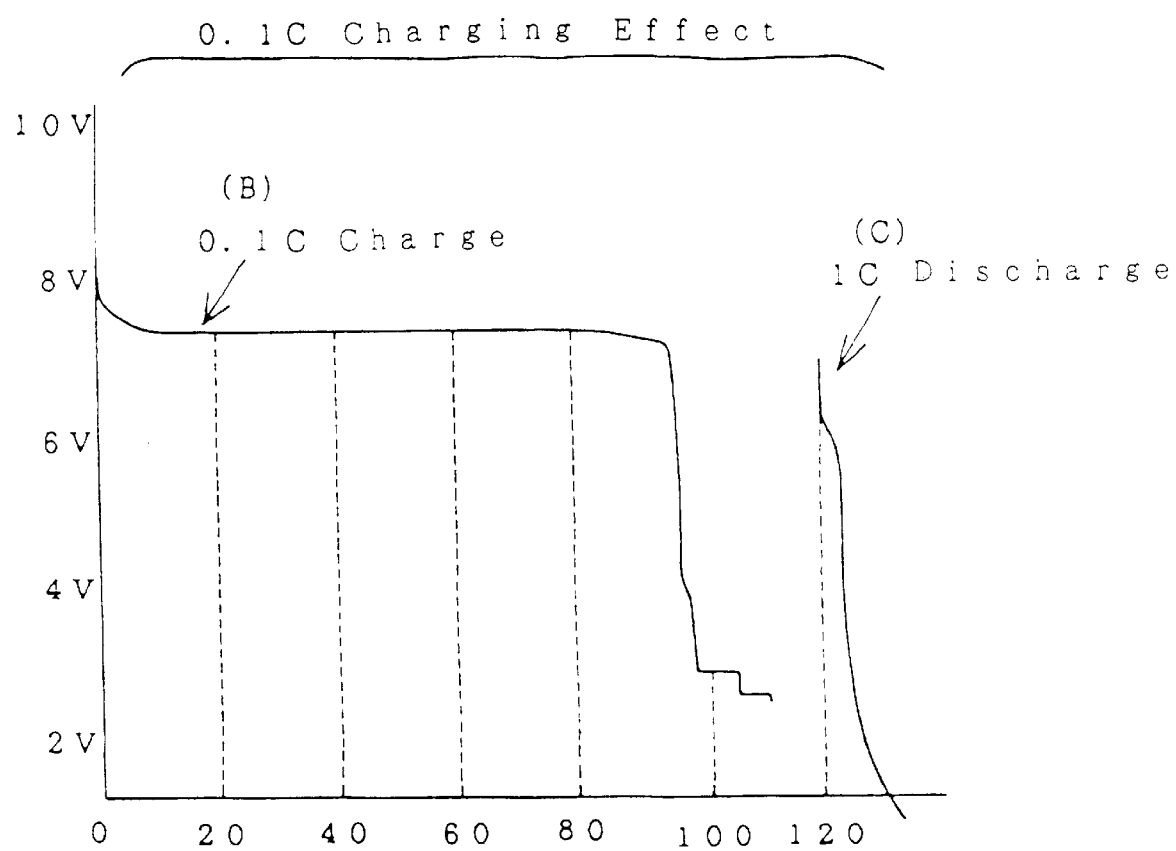
Figure 9:
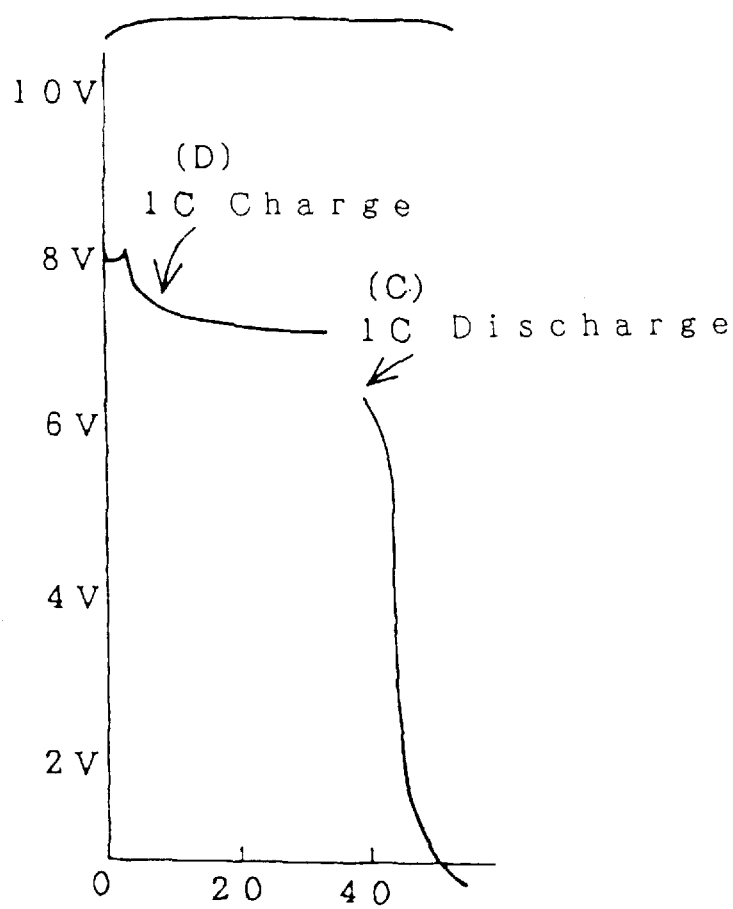

Here, a current capacity of 900 mAh is considered 1 C, and with the charging shown in Block Diagram (B), FIG. 6 shows a discharge current of 1 C (900 mAh); FIG. 7, 0.5 C; and continuing as in (D), FIG. 8 shows a charging at 0.1 C. These diagrams show the respective relationship between the Ni—Cd terminal voltage. FIG. 9 shows the effect on the electric double layer battery at 1 C charging.

As becomes clear from the above, if the discharge current from the electric double layer battery is made to be one-tenth of the Ni—Cd battery current, it can be seen that the charging times will be slow. However, if the charging current capacity from the electric double layer battery is too small, the capacity of the electric double layer battery must be chosen with care, in view of the fact that the Ni—Cd battery of the following stage will not be charged.

As explained above, according to the portable electric power source device with attached battery charger of the present invention, more than 90% of semiconductor devices can be handled in each home by distribution management, and it is possible to obtain a battery power source which can perform long term charging as part of the electric power source of vehicles, to supply current and instantaneous pulse voltage, including automobile ignition.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A portable electric power source with attached battery charger, comprising: a first stage comprising a solar cell; a second stage in parallel with the first stage and comprising an electric double layer battery; and a third stage comprising a constant voltage battery in parallel with said first and second stages; the capacity of said electric double layer battery being larger than the capacity of the constant voltage battery; said first, second, and third stages being continuously connected to each other in parallel during operation; converter means enabling charging of said constant voltage battery by said electric double layer battery; and means for electrically connecting a load in parallel with said first, second, and third stages.

2. An electrical power system, comprising in parallel:

A. a solar cell adapted to receive photonic radiation and provide an electrical output;

B. a constant current secondary battery;

C. a constant voltage secondary battery;

D. converter means electrically connecting said constant current battery and said constant voltage battery; and E. means for connecting a load to said power system;

wherein said constant current secondary battery, said constant voltage secondary battery, and said solar cell are continuously connected in parallel to each other during operation.

3. The system of claim 2, where said constant current secondary battery is an electrical double layer battery.

4. The system of claim 2, wherein said constant voltage battery is selected from nickel-cadmium and lithium batteries.

5. The system of claim 2, further comprising in parallel a voltage converter effective to convert electrical power from said constant current battery for charging said constant voltage battery.

6. The system of claim 2, further comprising means for controlling the direction of current flow in said system.

7. The system of claim 2, further comprising means for eliminating direct current from said system.

* * * * *